US012037831B2

(12) United States Patent
Schroeder

(10) Patent No.: US 12,037,831 B2
(45) Date of Patent: Jul. 16, 2024

(54) REFRIGERATOR WITH SELF-REVERSING DOOR OPENER

(71) Applicant: Haier US Appliance Solutions, Inc., Wilmington, DE (US)

(72) Inventor: Michael Goodman Schroeder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 158 days.

(21) Appl. No.: 17/673,196

(22) Filed: Feb. 16, 2022

(65) Prior Publication Data

US 2023/0258037 A1 Aug. 17, 2023

(51) Int. Cl.

*E05F 15/622* (2015.01)
*F25D 23/02* (2006.01)

(52) U.S. Cl.

CPC .......... *E05F 15/622* (2015.01); *F25D 23/028* (2013.01); *E05Y 2201/434* (2013.01); *E05Y 2201/474* (2013.01); *E05Y 2201/702* (2013.01); *E05Y 2201/71* (2013.01); *E05Y 2900/31* (2013.01)

(58) Field of Classification Search

CPC .... E05F 15/622; E05F 15/619; F25D 23/028; F25D 23/02; E05Y 2201/434; E05Y 2201/474; E05Y 2201/702; E05Y 2201/71; E05Y 2900/31; E05Y 2201/426

See application file for complete search history.

(56) References Cited

U.S. PATENT DOCUMENTS

| | | | | |
|---|---|---|---|---|
| 10,648,218 B1 * | 5/2020 | Schroeder | E05F 15/616 | |
| 2011/0214349 A1 * | 9/2011 | Chan | E05F 17/00 | 49/360 |
| 2013/0154461 A1 * | 6/2013 | Bohle | E05F 15/614 | 312/319.6 |
| 2015/0338156 A1 * | 11/2015 | Held | E05D 7/00 | 312/405 |
| 2018/0119475 A1 * | 5/2018 | Kim | F25D 23/028 | |
| 2018/0187470 A1 * | 7/2018 | Song | F25D 23/087 | |
| 2018/0223582 A1 * | 8/2018 | Shin | E05F 15/619 | |
| 2018/0283066 A1 * | 10/2018 | Lee | E05F 1/00 | |
| 2018/0283077 A1 * | 10/2018 | Lee | E05D 3/16 | |

(Continued)

FOREIGN PATENT DOCUMENTS

| | | | |
|---|---|---|---|
| CN | 207963283 U | 10/2018 | |
| DE | 102019128526 B3 * | 3/2021 | A47L 15/4259 |

(Continued)

OTHER PUBLICATIONS

English translation for DE-102019128526-B3 (Year: 2021).*

*Primary Examiner* — Hiwot E Tefera

(74) *Attorney, Agent, or Firm* — Dority & Manning, P.A.

(57) ABSTRACT

A refrigerator appliance includes a cabinet defining a food storage chamber. A door is positioned on the cabinet and is movable between a closed position and an open position. A door opener includes a casing, a push screw extending through the casing towards the door and a motor in operative communication with the push screw. The motor is configured to move the push screw when the motor is activated. The motor rotates a drive gear when the motor is activated and the push screw reciprocates generally along a linear direction when the motor is activated.

20 Claims, 12 Drawing Sheets

(56) References Cited

U.S. PATENT DOCUMENTS

| | | | | |
|---|---|---|---|---|
| 2018/0291669 | A1* | 10/2018 | Kim | F25D 23/028 |
| 2018/0347892 | A1* | 12/2018 | Kim | F25D 29/00 |
| 2019/0072322 | A1* | 3/2019 | Murata | E05F 15/614 |
| 2019/0106925 | A1* | 4/2019 | McCorkell | F16H 25/24 |
| 2019/0162006 | A1* | 5/2019 | Lee | E05F 15/619 |
| 2020/0056414 | A1* | 2/2020 | Oestermann | E05F 15/622 |
| 2020/0263479 | A1* | 8/2020 | Lee | F25D 23/028 |
| 2021/0293071 | A1* | 9/2021 | Leonard | E05F 15/622 |
| 2022/0178194 | A1* | 6/2022 | Gunn | E05F 15/73 |

FOREIGN PATENT DOCUMENTS

| | | | |
|---|---|---|---|
| DE | 102021121458 | A1 * | 2/2023 |
| JP | 2002364712 | A | 12/2002 |

* cited by examiner

REFRIGERATOR WITH SELF-REVERSING DOOR OPENER

FIELD OF THE INVENTION

The subject matter of the present disclosure relates generally to appliances having a cabinet and a door. For example, such appliances may include refrigerator appliances.

BACKGROUND OF THE INVENTION

Refrigerator appliances generally include a cabinet that defines one or more chilled chambers for receipt of food items for storage. One or more insulated, sealing doors are provided for selectively enclosing the chilled food storage chamber(s). Generally, the door(s) are movable between a closed position and an open position for accessing food items stored therein by pulling on the door(s), such as by pulling on a handle on the door.

In some instances, for example, when a user's hands are full of groceries to load into the refrigerator or are covered in raw food ingredients from cooking, etc., a user may prefer to open the door without having to grasp the door, or a part of the door such as the handle, in the user's hand. In particular, a user may prefer to nudge or push on the door to open the door.

Accordingly, a refrigerator having an improved means for opening a door thereof would be useful. In particular, a refrigerator appliance having a means for automatically opening a door thereof would be desirable.

BRIEF DESCRIPTION OF THE INVENTION

Aspects and advantages of the invention will be set forth in part in the following description, or may be apparent from the description, or may be learned through practice of the invention.

In a first exemplary embodiment, a refrigerator appliance is provided. The refrigerator appliance defines a vertical direction, a lateral direction, and a transverse direction. The vertical, lateral, and transverse directions are mutually perpendicular. The refrigerator appliance includes a cabinet defining a food storage chamber. The food storage chamber extends between a front portion and a back portion along the transverse direction. The front portion of the food storage chamber defines an opening for receipt of food items. A door is positioned at the front portion of the food storage chamber and is movable between a closed position and an open position. The door thus selectively sealingly encloses the food storage chamber in the closed position and provides access to the food storage chamber in the open position. A door opener is attached to the cabinet. The door opener includes a casing, a push screw extending through the casing towards the door and a motor in operative communication with the push screw. The motor is configured to move the push screw when the motor is activated. The motor rotates a drive gear when the motor is activated and the push screw reciprocates generally along the transverse direction when the motor is activated. The motor rotates the drive gear in a single direction while the push screw reciprocates generally along the transverse direction.

In a second exemplary embodiment, a refrigerator appliance is provided. The refrigerator appliance defines a vertical direction, a lateral direction, and a transverse direction. The vertical, lateral, and transverse directions are mutually perpendicular. The refrigerator appliance includes a cabinet defining a food storage chamber. The food storage chamber extends between a front portion and a back portion along the transverse direction. The front portion of the food storage chamber defines an opening for receipt of food items. A door is positioned at the front portion of the food storage chamber and is movable between a closed position and an open position. The door thus selectively sealingly encloses the food storage chamber in the closed position and provides access to the food storage chamber in the open position. A door opener is attached to the cabinet. The door opener includes a casing, a push screw extending through the casing towards the door and a motor in operative communication with the push screw. The motor is configured to move the push screw when the motor is activated. The motor rotates a drive gear when the motor is activated and the push screw reciprocates generally along the transverse direction when the motor is activated. The motor rotates the drive gear continuously while the push screw reciprocates generally along the transverse direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
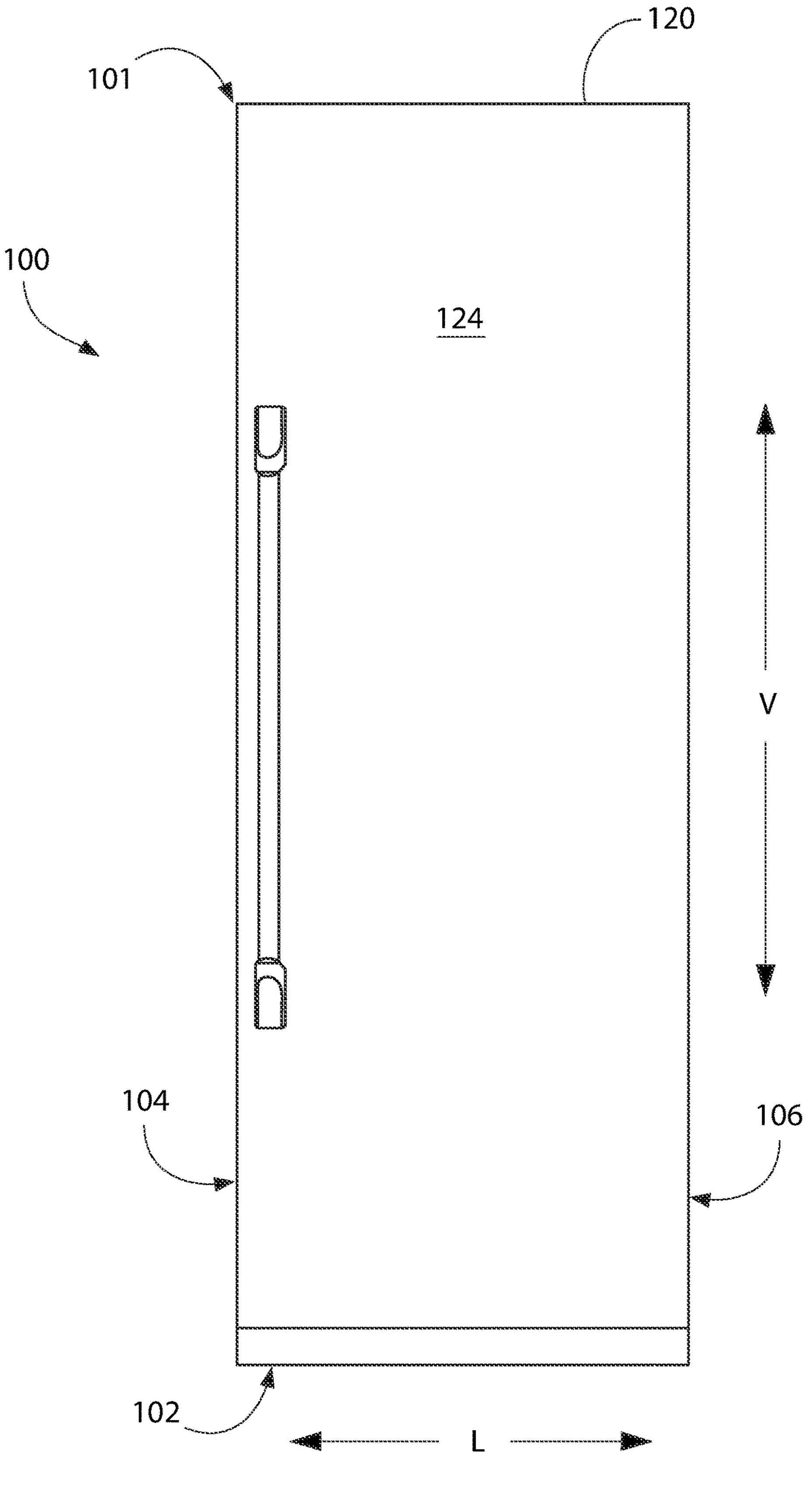
FIG. 1 provides a front elevation view of a refrigerator appliance according to an exemplary embodiment of the present subject matter with a door of the refrigerator appliance shown in the closed position.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. The detailed description uses numerical and letter designations to refer to features in the drawings. Like or similar designations in the drawings and description have been used to refer to like or similar parts of the disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. Terms such as "left," "right," "front," "back," "top," or "bottom" are used with reference to the perspective of a user accessing the refrigerator appliance. For example, a user stands in front of the refrigerator to open the door(s) and reaches into the food storage chamber(s) to access items therein.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
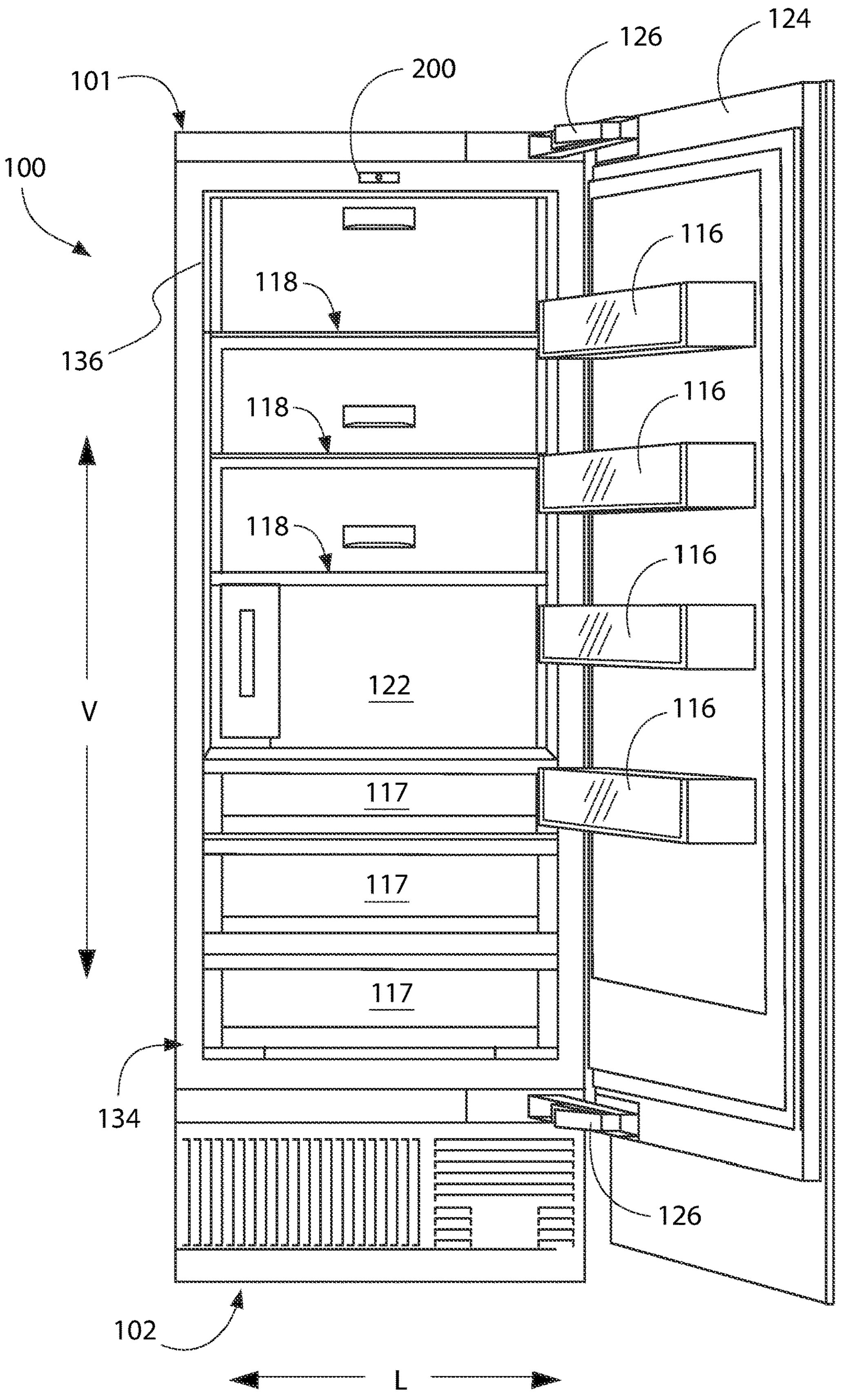
FIG. 2 provides a front elevation view of the exemplary refrigerator appliance of FIG. 1 with the door shown in an open position.
Figure 3:
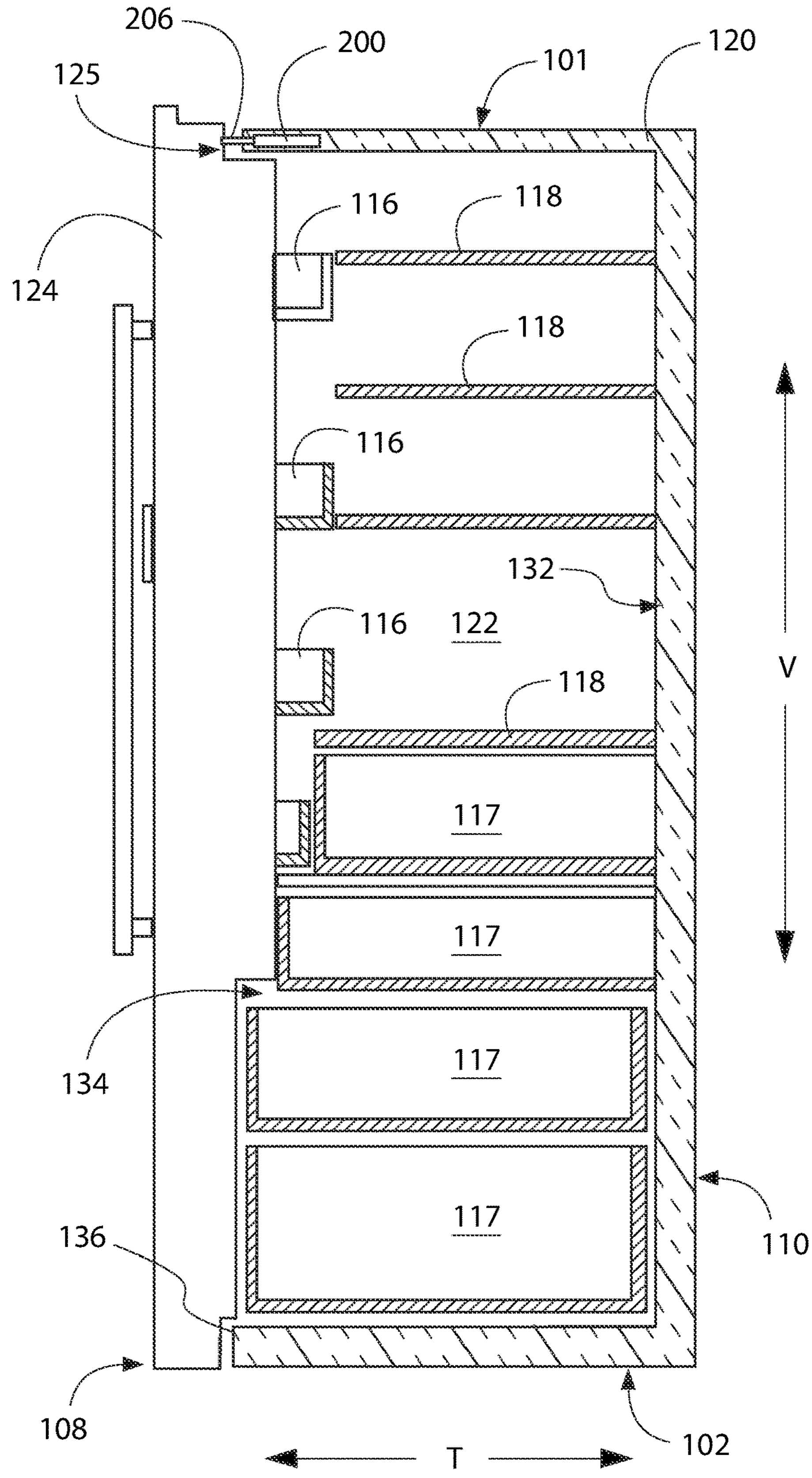
FIG. 3 provides a cross-section view of the exemplary refrigerator appliance of FIG. 1.

As illustrated in FIGS. 1 through 3, an exemplary refrigerator appliance 100 has an insulated housing or cabinet 120 that defines a food storage chamber 122. A door 124 is provided to selectively sealingly enclose the food storage chamber 122 when in a closed position (FIG. 1) and provide access to the food storage chamber 122 when in an open position (FIG. 2). The door 124 is rotatably mounted to the cabinet 120, such as by one or more hinges 126 (FIG. 2), to rotate between the open position and the closed position.

Refrigerator appliance 100 defines a vertical direction V, a lateral direction L, and a transverse direction T (FIG. 3), each mutually perpendicular to one another. As may be seen in FIGS. 1 through 3, the cabinet or housing 120 extends between a top 101 and a bottom 102 along the vertical direction V, between a left side 104 and a right side 106 along the lateral direction L, and between a front 108 (FIG. 3) and a rear 110 (FIG. 3) along the transverse direction T. As may be seen in FIGS. 2 and 3, the food storage chamber 122 extends between a front portion 134 and a back portion 132 along the transverse direction T. The front portion 134 of the food storage chamber 122 defines an opening 136 for receipt of food items. The food storage chamber 122 is a chilled chamber 122 for receipt of food items for storage. As used herein, the chamber may be "chilled" in that the chamber is operable at temperatures below room temperature, e.g., less than about seventy-five degrees Fahrenheit (75° F.). One of ordinary skill in the art will recognize that the food storage chamber 122 may be chilled by a sealed refrigeration system, such that the food storage chamber 122 may be operable at or about the temperatures described herein by providing chilled air from the sealed system. The structure and function of such sealed systems are understood by those of ordinary skill in the art and are not described in further detail herein for the sake of brevity and clarity.

Refrigerator door 124 is rotatably mounted, e.g., hinged, to an edge of cabinet 120 for selectively accessing the fresh food storage chamber 122 within the cabinet 120. Refrigerator door 124 may be mounted to the cabinet 120 at or near the front portion 134 of the food storage chamber 122 such that the door 124 moves, e.g., rotates via hinges 126, between the closed position (FIG. 1) and the open position (FIG. 2). In the closed position of FIG. 1, the door 124 sealingly encloses the food storage chamber 122. Additionally, one or more gaskets and other sealing devices, which are not shown but will be understood by one of ordinary skill in the art, may be provided to promote sealing between the door 124 and the cabinet 120. In the open position of FIG. 2, the door 124 permits access to the fresh food storage chamber 122.

As shown for example in FIGS. 2 and 3, various storage components may be mounted within the food storage chamber 122 to facilitate storage of food items therein as will be understood by those skilled in the art. In particular, the storage components include bins 116, drawers 117, and shelves 118 that are mounted within fresh food chamber 122. Bins 116, drawers 117, and shelves 118 are configured for receipt of food items (e.g., beverages and/or solid food items) and may assist with organizing such food items.

As depicted, cabinet 120 defines a single chilled chamber 122 for receipt of food items for storage. In the present example, the single chilled chamber 122 is a fresh food chamber 122. In some embodiments, the chilled chamber may be a freezer chamber and/or the refrigerator appliance 100 may include one or more additional chilled chambers for receipt of various food items and storage of such items at various temperatures as desired. For example, the refrigerator appliance 100 may include one or more chilled chambers configured for deep freeze (e.g., at about 0° F. or less) storage, or configured for chilling, e.g., produce or wine, at relatively warmer temperatures such as about 60° F. or more (while still below room temperature, as noted above), as well as any suitable temperatures between the stated examples. In various exemplary embodiments, the chilled chamber 122 may be selectively operable at any number of various temperatures and/or temperature ranges as desired or required per application, and/or the refrigerator appliance 100 may include one or more additional chambers selectively operable at any suitable food storage temperature.

The illustrated exemplary refrigerator appliance 100 is generally referred to as a single-door or single-purpose refrigerator, sometimes also referred to as a column refrigerator. It is recognized, however, that the benefits of the present disclosure apply to other types and styles of refrigerators such as, for example, a bottom mount refrigerator, a top mount refrigerator, a side-by-side style refrigerator, or a freezer appliance. Consequently, the description set forth herein is for illustrative purposes only and is not intended to be limiting in any aspect to a particular refrigerator chamber configuration. Additionally, door openers as described herein may be useful in other types of appliances such as microwave oven appliances, clothes washer/dryer appliances, etc., and/or other contexts wherever the disclosed features may be desired.

As may be seen in FIGS. 2 and 3, the refrigerator appliance 100 may include a door opener 200. The door opener 200 may be positioned in the cabinet 120 and/or attached to the cabinet 120. For example, the door opener may be positioned outside of and adjacent to the chamber 122. In some exemplary embodiments, the door opener 200 may touch and/or be embedded within the thermal insulation, e.g., foam, surrounding the chamber 122. In other exemplary embodiments, the door opener 200 may be attached to the exterior of the cabinet 120, above the top of the cabinet 120. For example, the door opener 200 may be positioned proximate the front 108 of the cabinet 120 and the opening 136 of the food storage chamber 122. In the illustrated exemplary embodiment, the door opener 200 is positioned proximate the top 101 of the cabinet 120 along the vertical direction V and is generally centered along the lateral direction L. That is, the example door opener 200, as best seen in FIG. 2, is positioned at or about a lateral midpoint of the cabinet 120 and/or the opening 136 of the food storage chamber 122. In other embodiments, the door opener 200 may be positioned at other locations, such as near the bottom 102 along the vertical direction V. In some embodiments, centering the door opener 200 along the lateral direction L may advantageously provide flexibility in mounting the door 124. For example, the illustrated refrigerator appliance 100 includes the door 124 mounted on the right side 106. In other embodiments, the door 124, e.g., the hinges 126, may be mounted to the cabinet 120 at or near the left side 104. In embodiments where the door opener 200 is centered along the lateral direction L, the door opener 200 will apply generally the same opening force to the door 124 when the door 124 is mounted to either left side 104 or right side 106, e.g., the moment arm or leverage applied to the door 124 as it rotates about the hinges 126 will be generally the same.

The casing 202 of the door opener 200 may be fixedly mounted to the cabinet 120, e.g., via mechanical fasteners. The casing 202 may be fixedly mounted to the cabinet 120 in that the casing 202 is not movable relative to the cabinet 120 during the ordinary and intended operation of the refrigerator appliance 100 (including the door opener 200 thereof). The door opener 200 also includes a push screw 206 which includes a front portion or rod portion 210 and a threaded middle portion 208. As will be described in more detail below, the push screw 206 is movable relative to the casing 202 of the door opener 200 and relative to the cabinet 120 of the refrigerator appliance 100.

Figure 9:
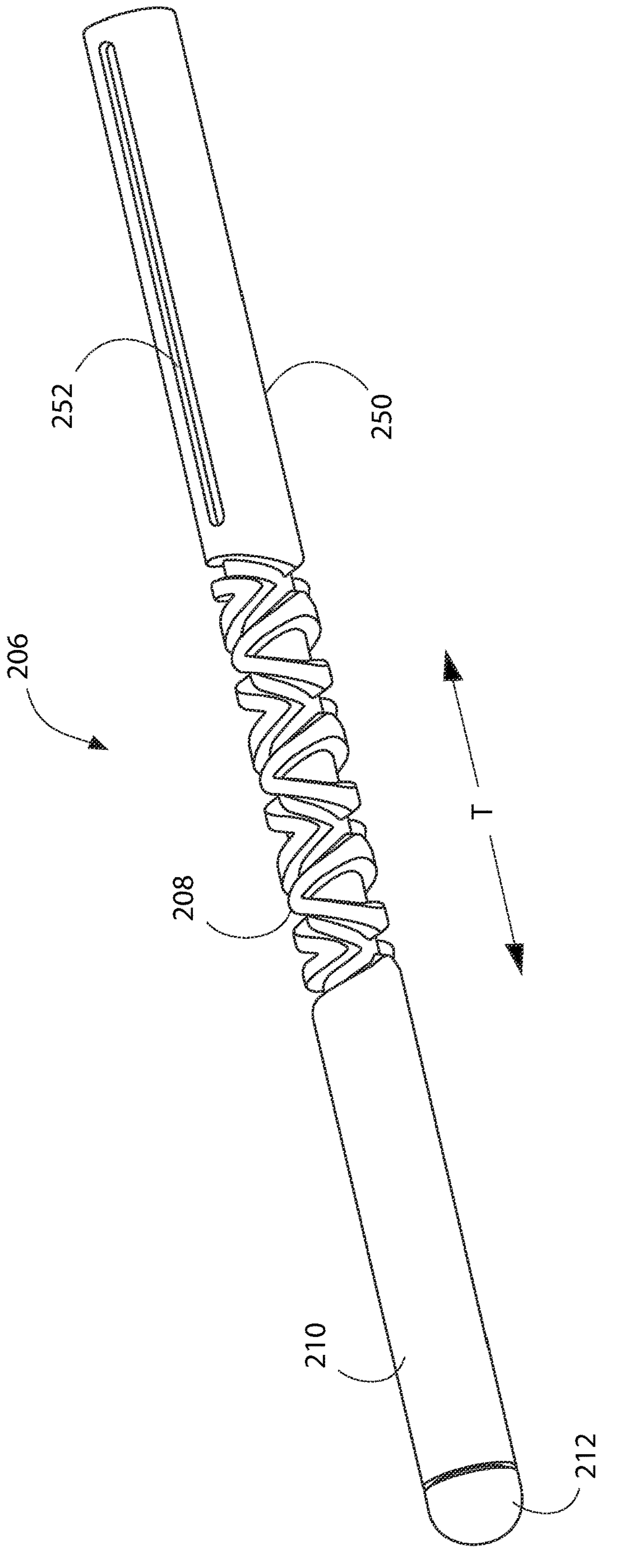
FIG. 9 provides a perspective view of an exemplary push screw according to one or more embodiments of the present subject matter which may be incorporated into a door opener such as the exemplary door opener of FIG. 4.
Figure 11:
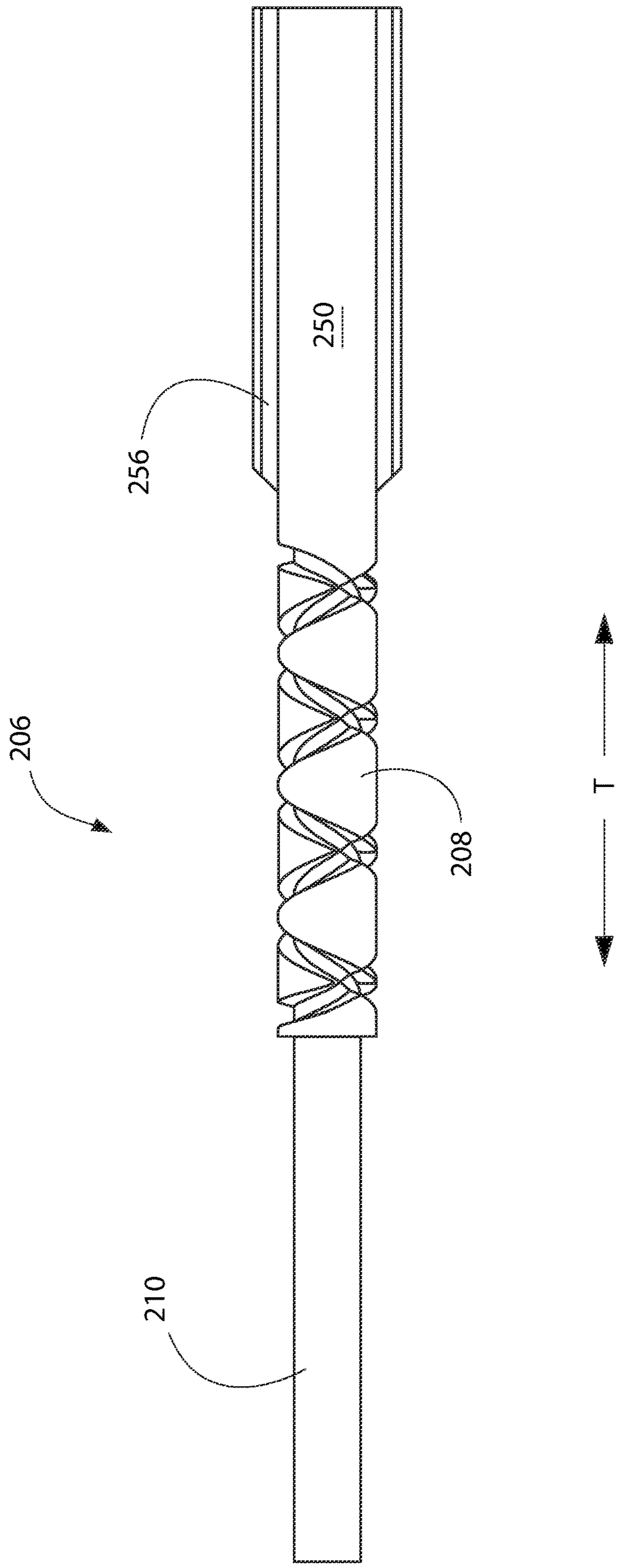
FIG. 11 provides a side view of an exemplary push screw according to one or more additional embodiments of the present subject matter which may be incorporated into a door opener such as the exemplary door opener of FIG. 4.

The push screw 206 may also include a back portion 250 having guide elements defined thereon. For example, the guide elements may constrain the push screw 206 against rotation about the transverse direction T, whereby the push screw 206 may translate generally along the transverse direction T (described further below) with little or no twisting or rotation about the transverse direction T. In various embodiments, the guide elements may include one or more slots 252 (e.g., FIG. 6 and FIG. 9) and/or one or more fins 256 (e.g., FIG. 11). The slot(s) 252, when provided, may receive tabs 254 (FIG. 6) of the casing 202 therein to constrain the push screw 206 against rotation about the transverse direction T. The fin(s) 256, when provided, may be received within corresponding slots defined in the casing 202 to constrain the push screw 206 against rotation about the transverse direction T.

In some embodiments, the push screw 206 may include a tip 212 (see, e.g., FIG. 6) which engages the inner surface 125 of the door 124. The push screw 206, e.g., rod portion 210 thereof, may extend through the casing 202 towards the door 124 of the refrigerator appliance 100, e.g., as may be seen in FIG. 3. As depicted in FIG. 3, the door opener 200 is in a zero position. FIG. 3 illustrates the zero position of the door opener 200, and in particular the push screw 206 thereof, relative to the cabinet 120 of the refrigerator appliance 100. Additionally, the door opener 200 may be movable, e.g., forward along the transverse direction T, from the zero position to an extended position, where the push screw 206 extends from the casing 202 sufficiently to urge the door 124 away from the cabinet 120, e.g., away from the closed position of the door 124 illustrated in FIG. 3 and towards the open position of the door 124 illustrated in FIG. 2.

The push screw 206 may be biased forwards (e.g., towards front 108) along the transverse direction T by a protective spring 232. For example, the protective spring 232 may provide resiliency in the event that the door 124 is closed while the door opener 200 is in the extended position, e.g., the protective spring 232 may permit the push screw 206 and slip yoke 240 to deflect backwards (e.g., towards rear 110) while the spring 232 absorbs the force from the door 124 when the door 124 is closed while the door opener 200 is in the extended position.

The door opener 200 may be self-reversing or automatically reversing. For example, the push screw 206 may reciprocate, e.g., move back and forth between and including the zero position and the extended position, generally along transverse direction T. In at least some embodiments, such reciprocal motion may be driven by a motor 214, e.g., the motor 214 may rotate a drive gear 216 and such rotation may be transferred to the push screw 206 in a manner that causes the push screw 206 to translate linearly, e.g., back and forth between and including the zero position and the extended position, as will be described in more detail below. Such reciprocation may include, for example, the push screw 206 moving in a first direction, e.g., forwards, such as towards front 108, along the transverse direction T from the zero position to the extended position followed by moving in a second direction generally opposite the first direction (such as generally 180° away from the first direction), e.g., backwards, such as towards rear 110, along the transverse direction T from the extended position to the zero position. For example, in some embodiments the motor 214 may rotate the drive gear 216 in a single direction while the push screw 206 reciprocates generally along the transverse direction T. As another example, in at least some embodiments the motor 214 may rotate the drive gear 216 continuously while the push screw 206 reciprocates generally along the transverse direction T. Further, in some embodiments, the drive gear 216 may rotate both continuously and in a single direction (e.g., clockwise or counterclockwise). Such continuous rotation of the drive gear 216 by the motor 214 is not necessarily at a single speed, e.g., the rotation may speed up or slow down, but may still be considered continuous as the rotation speed is greater than zero throughout the linear range of motion of the push screw 206, e.g., generally along the transverse direction T, such as from the zero position to the extended position and back to the zero position again. Thus, such continuous and/or unidirectional rotation of the drive gear 216 (which may be transferred to the push screw 206 via one or more intervening elements, e.g., gears and a guide blade, as described in more detail below) causes the push screw 206 to move back and forth, e.g., in the first direction and the opposing second direction as described above. Thus, for example, the push screw 206 may be self-reversing at least in that the push screw 206 moves in two opposing directions without the motor 214 stopping and/or without the motor 214 changing a direction of rotation of the motor 214 and/or drive gear 216.

As may be seen throughout FIGS. 4 through 6, the door opener 200 may include a plurality of gears to transfer rotation from the motor 214 to the push screw 206 (whereupon the push screw 206 will translate, e.g., reciprocate, linearly due to the interaction of a guide blade 262 with threads of the push screw 206, as will be described in more detail below). In particular, FIG. 5 illustrates an exemplary plurality of gears with several adjacent components, e.g., housings and/or gear boxes, omitted in order to illustrate the exemplary gears more clearly. In some embodiments, the plurality of gears may include a step-down gear 218 engaged with the drive gear 216, e.g., the step-down gear 218 may be directly engaged with the drive gear 216, such that external teeth 220 of the drive gear 216 bear against and are in direct contact with a first set of external teeth 222 of the step-down gear 218, whereby rotation of the drive gear 216 causes the step-down gear 218 to rotate, e.g., the rotation of the drive gear 216 by the motor 214 is directly transferred from the drive gear 216 to the step-down gear 218. As best seen in FIG. 5, the step-down gear 218 may also include a second set of external teeth 224, and the second set of external teeth 224 may be engaged with, e.g., directly engaged with in the same manner as described above with respect to the step-down gear 218 and the drive gear 216, external teeth 228 of a gear 226, whereby rotation of the step-down gear 218 causes the gear 226 to rotate via the engagement of the second external teeth 224 of the step-down gear 218 with the external teeth 228 of the gear 226

Figure 4:
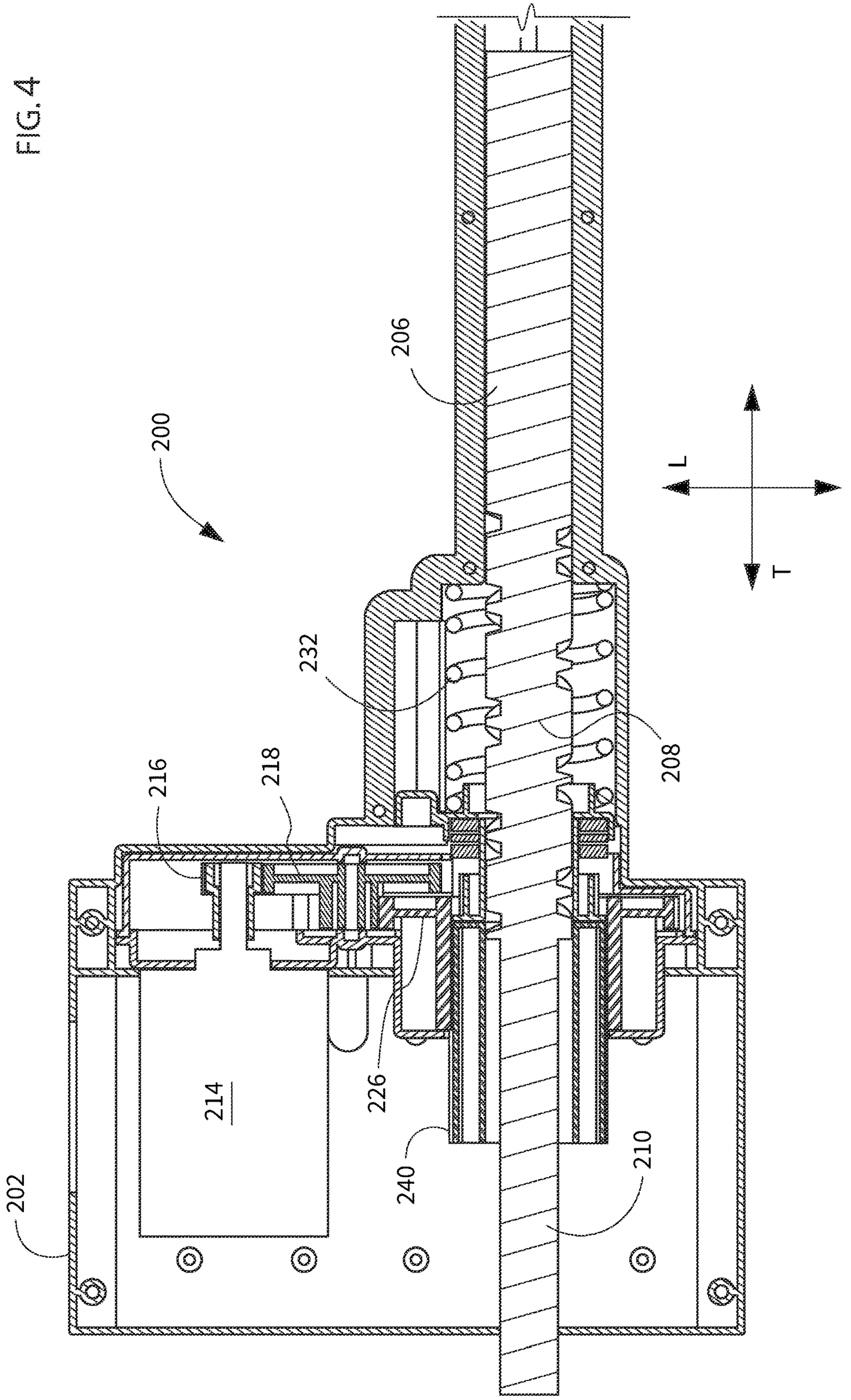
FIG. 4 provides a top-down section view of an exemplary door opener according to one or more embodiments of the present subject matter which may be incorporated into appliances such as the refrigerator appliance of FIG. 1.
Figure 5:
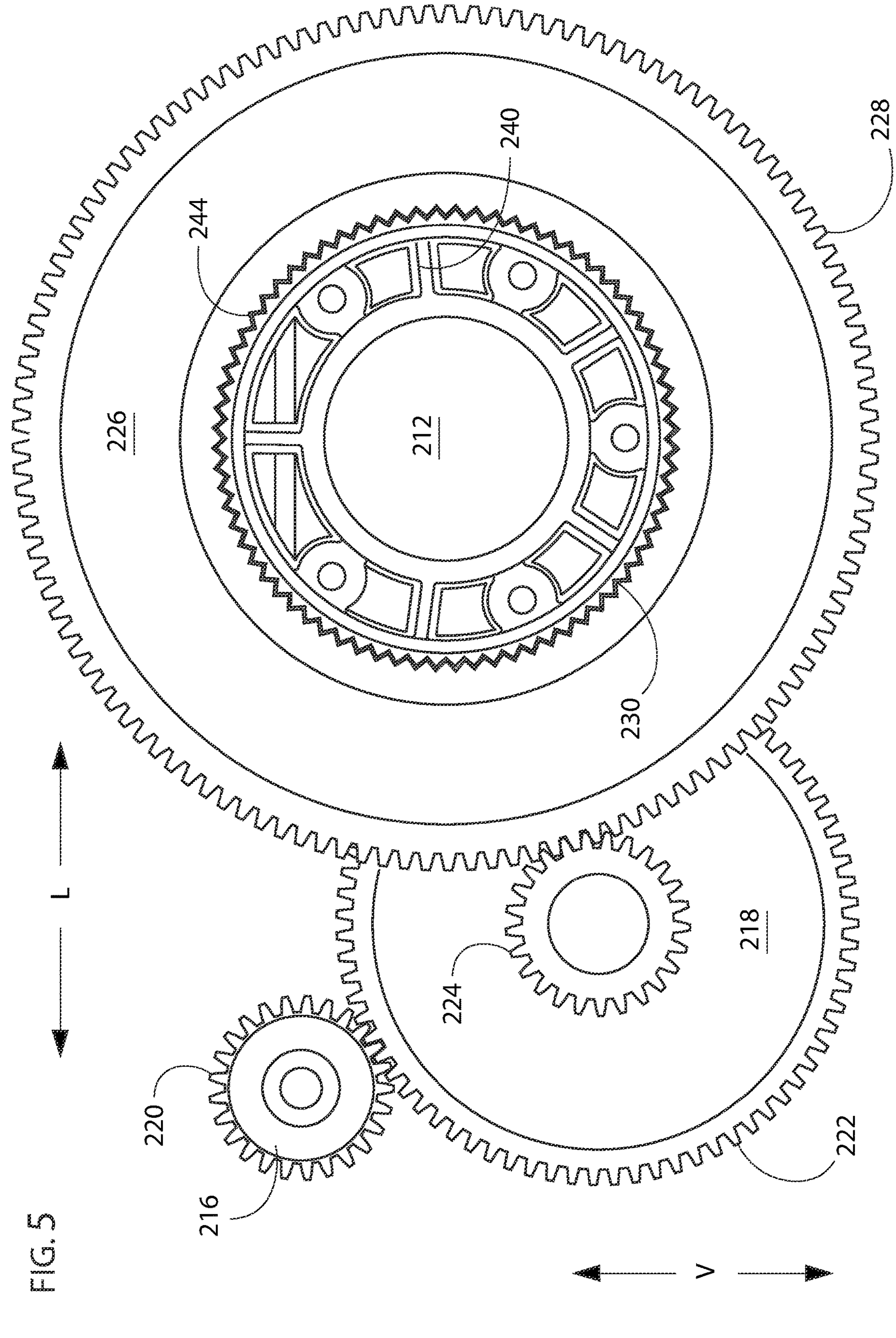
FIG. 5 illustrates a gear set of the exemplary door opener of FIG. 4.
Figure 6:
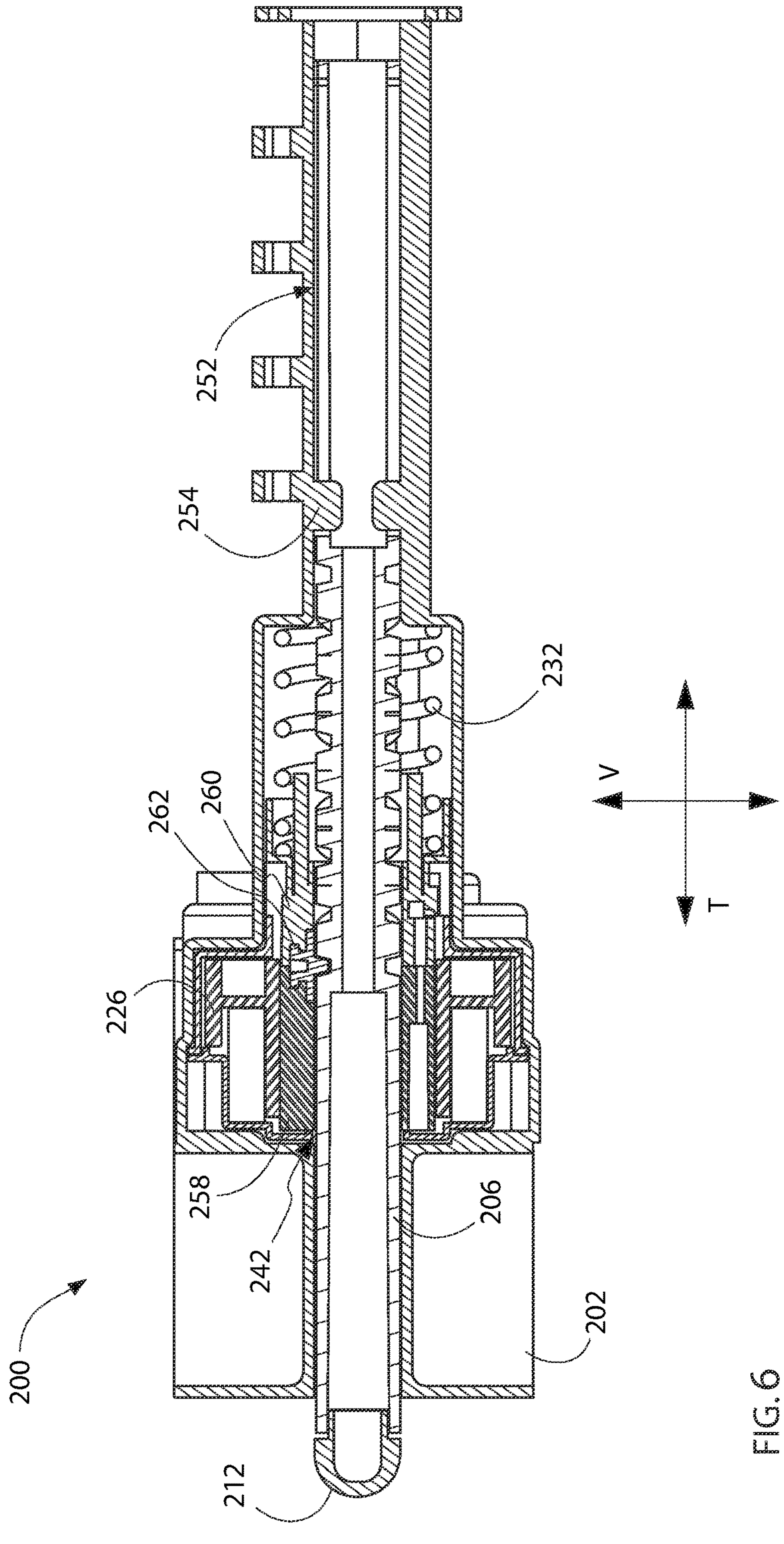
FIG. 6 provides a side section view of the exemplary door opener of FIG. 4.

Referring still to FIGS. 4-6, the door opener 200 may also include a slip yoke 240. The slip yoke 240 may be oriented generally along the transverse direction T, e.g., a longest dimension of the slip yoke 240 may be generally parallel to the transverse direction T. The slip yoke 240 may define a lumen 242 extending fully through the slip yoke 240 from front to back. The push screw 206, or a portion thereof, may extend through the slip yoke 240, such as through the lumen 242 of the slip yoke 240. The slip yoke 240 may also include external teeth 244 along at least a portion thereof, and the external teeth 244 of the slip yoke 240 may be engaged with, e.g., directly engaged (where “directly engaged” is used as defined above) with, internal teeth 230 of the gear 226.

Figure 7:
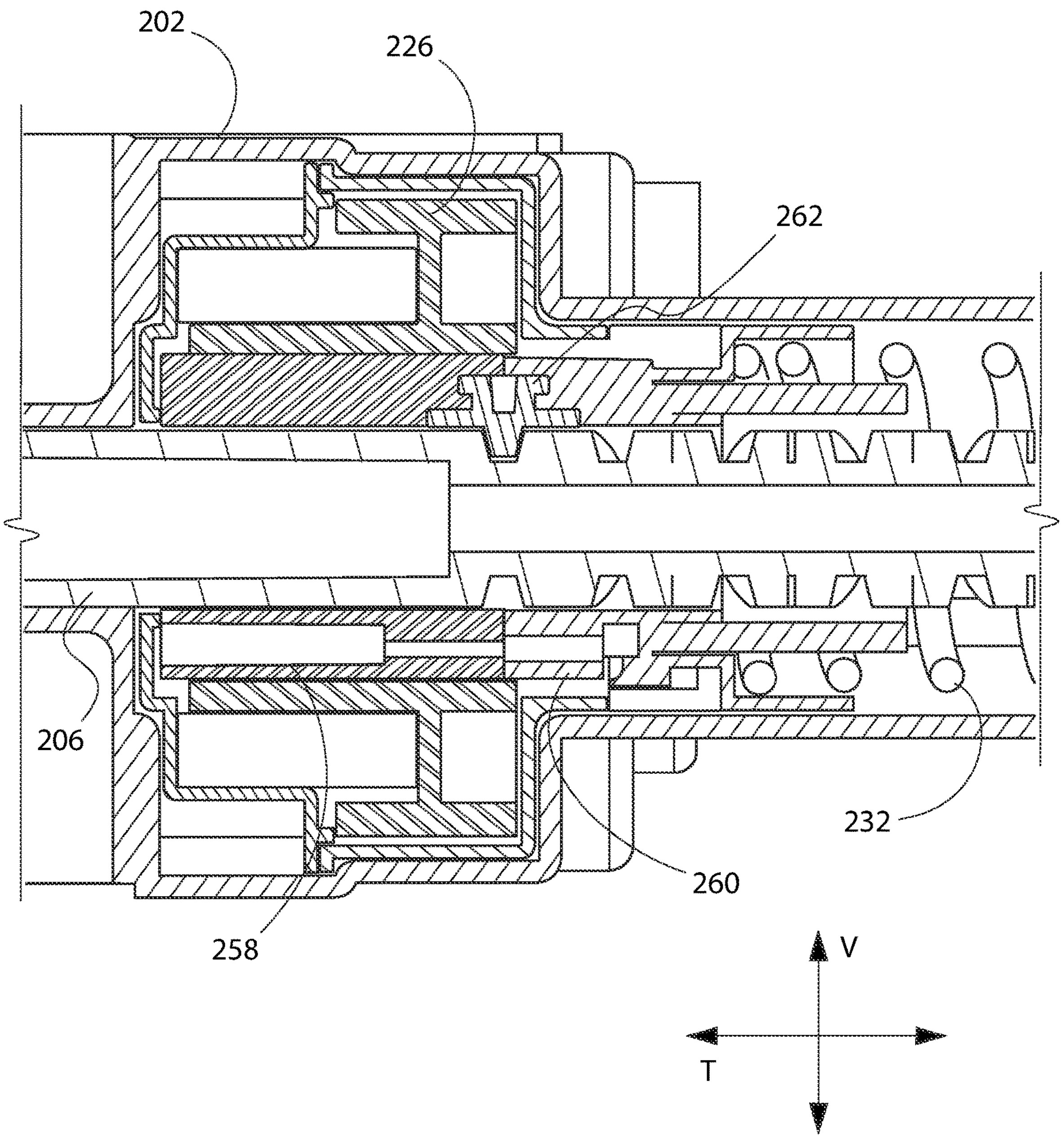
FIG. 7 provides an enlarged side section view of a portion of the exemplary door opener of FIG. 4.
Figure 8:
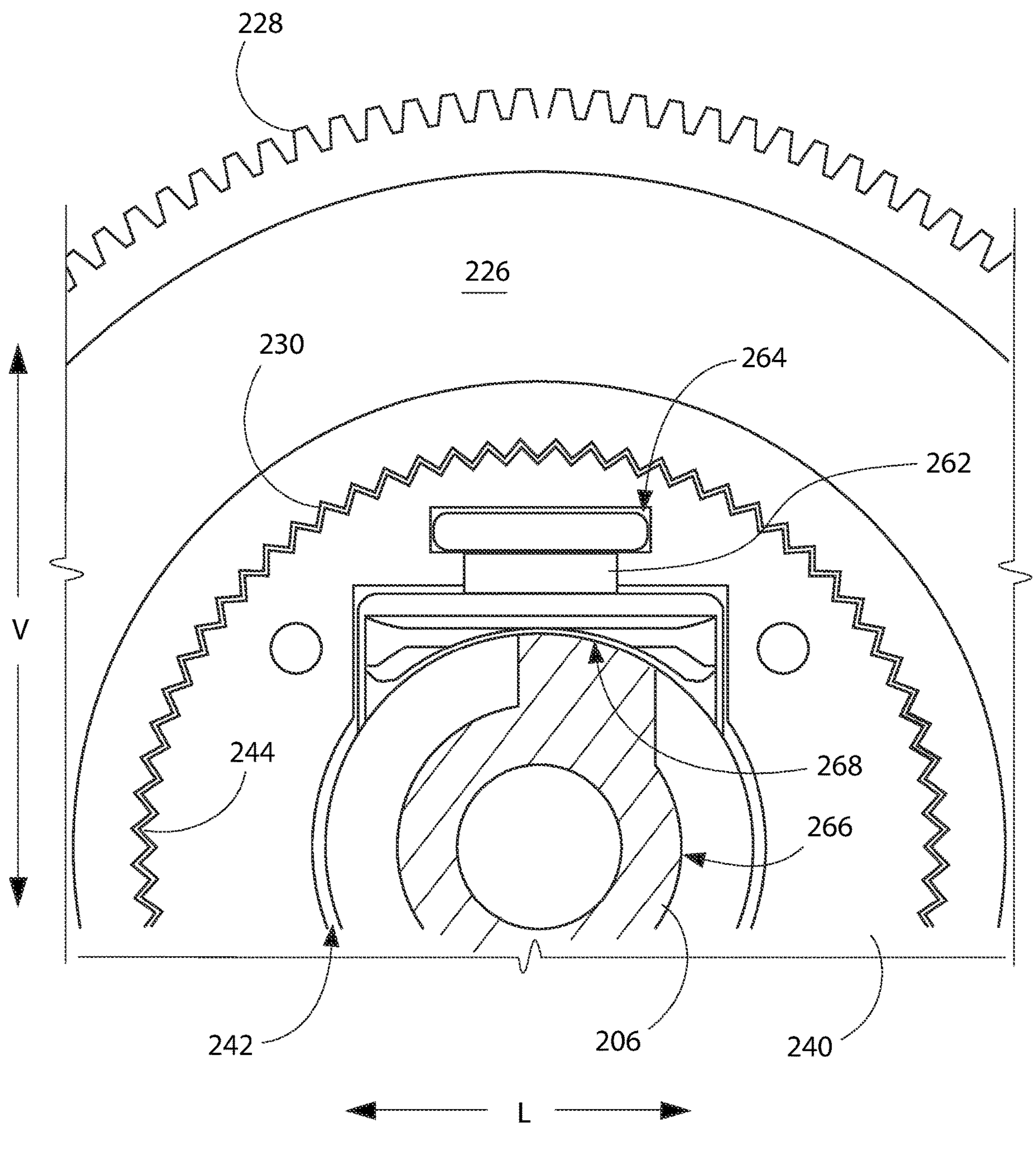
FIG. 8 illustrates certain components of the exemplary door opener of FIG. 4.

Referring now specifically to FIGS. 6 and 7, the slip yoke 240 may be formed of a multi-part construction, e.g., a two-part construction including a front portion 258 and a rear portion 260. In some embodiments, a guide blade 262 may be captured in the slip yoke 240, such as captured between the front portion 258 of the slip yoke 240 and the rear portion 260 of the slip yoke 240. As may be seen, e.g., in FIGS. 7 and 8, the guide blade 262 may be captured in a recess 264 defined in the slip yoke 240. Additionally, it should be noted that FIG. 8 presents a partially-sectioned view of a portion of the door opener 200. In particular, the section in FIG. 8 is taken through the threaded portion 208 of the push screw 206, e.g., such that the guide blade 262 is partially concealed by crests 268 (see also FIG. 10) of the thread of the push screw 206 in FIG. 8. Particular features of the exemplary guide blade 262 will be described in more detail below with reference to FIGS. 10 and 12.

As may be seen in FIGS. 6 through 8, the guide blade 262 engages with the thread on the threaded portion 210 of the push screw 206. For example, the guide blade 262 may move within the thread as the slip yoke 240 rotates around the push screw 206. The guide blade 262 is captured by the slip yoke 240, as described above, such that the guide blade 262 rotates around the push screw 206 as the slip yoke 240 rotates around the push screw 206. The guide blade 262 may also be free to pivot within the recess 264 of the slip yoke 240, such that an angle of the guide blade 262 relative to the push screw 206 varies in response to variations in the pitch of the thread of the push screw. Such variations in pitch will be described further below.

Figure 10:
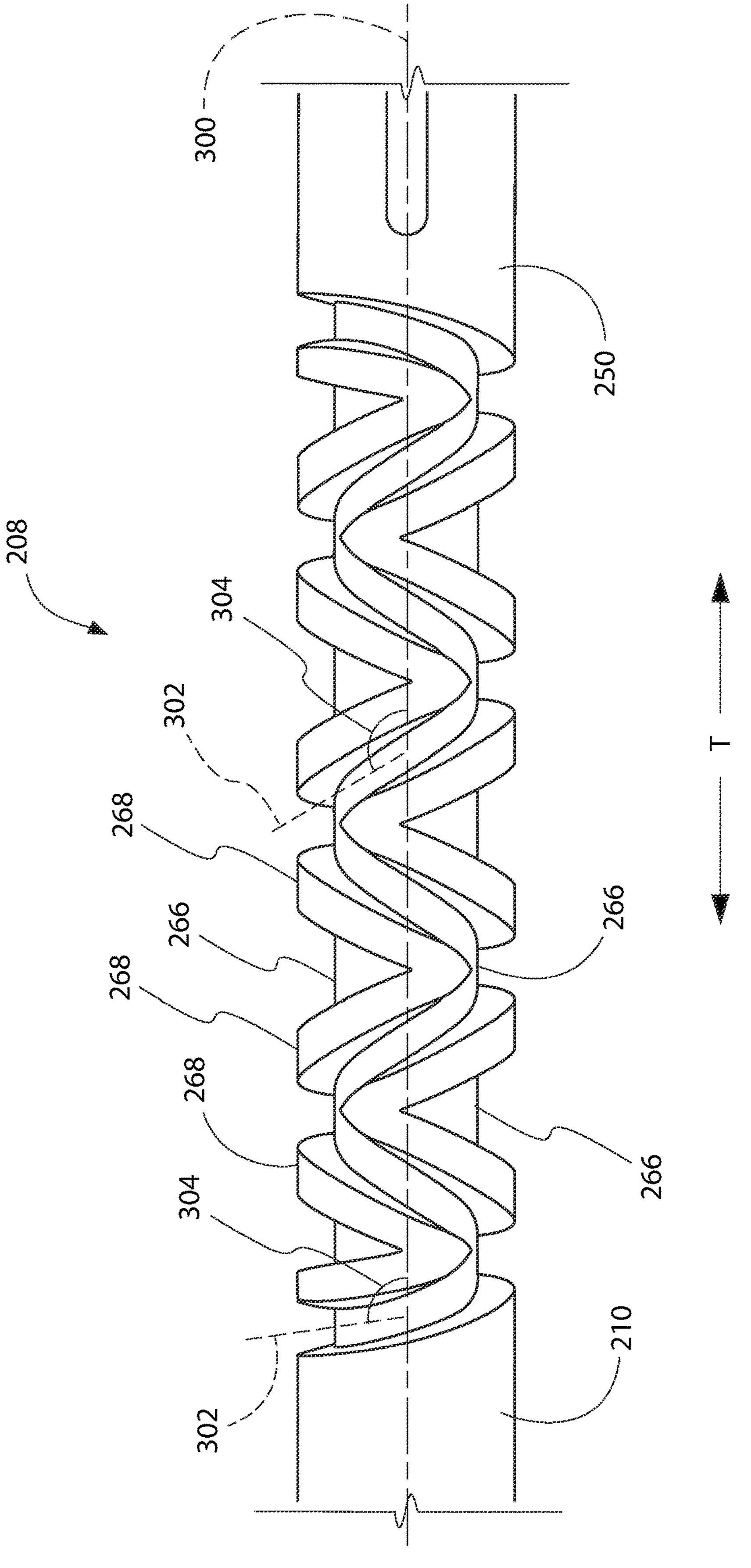
FIG. 10 provides an enlarged view of a portion of the exemplary push screw of FIG. 9.

FIG. 10 provides an enlarged view of the threaded portion 208 of the push screw 206. The push screw 206 defines a longitudinal axis 300, as noted in FIG. 10. Thus, the push screw 206 also defines an axial direction along and/or parallel to the longitudinal axis 300, as well as a radial direction perpendicular to the axial direction and a circumferential direction extending around the axial direction. As illustrated in FIG. 10, the thread encircles push screw 206 through the threaded portion 208 and defines a series of roots 266 and crests 268. The thread of the push screw 206 may encircle the push screw 206 along the circumferential direction around the longitudinal axis 300 of the push screw 206 and may be oriented at an oblique angle to the radial direction. The thread of the push screw 206 may be a helical thread. For example, the thread may be a double-helical thread which defines a first helical path along which the guide blade 262 travels to urge the push screw 206 forward and a second helical path continuously joined end-to-end with the first helical path, where the guide blade 262 travels along the second helical path to urge the push screw 206 rearward. The helical thread of the push screw 206 may also define a center line 302, e.g., generally equidistantly spaced between each adjacent crest 268 of the helical thread. As illustrated in FIG. 10, the center line 302 of the helical thread may define a pitch angle 304 relative to the longitudinal axis 300 of the push screw 206, e.g., a forward pitch measured from the longitudinal axis 300 of the push screw 206 towards the front portion 210 of the push screw 206 is annotated in FIG. 10, such as may be defined by the first helical path of a double helical thread, as described above. Although not specifically annotated in FIG. 10, it should be understood that the second helical path of the double helical thread defines a rearward pitch which is generally opposite (e.g., about 180° from) the annotated forward pitch. As may be seen, e.g., in FIG. 10, the helical thread of the push screw may define a variable pitch 304, such as the pitch angle 304 may vary across the threaded portion 208 of the push screw 206. For example, the pitch angle 304 may be greater, e.g., steeper, around the center (along the transverse direction T) of the threaded portion 208 and may be less, e.g., shallower, at each transverse (e.g., forward and rear) end of the helical thread across the threaded portion 208.

As mentioned above, the slip yoke 240 rotates around the push screw 206 when the motor 214 is activated, e.g., when the slip yoke 240 rotates along the circumferential direction. Also as mentioned above, the guide blade 262 is captured within the slip yoke 240, e.g., such that the guide blade 262 is inhibited from linearly translating along the radial direction towards or away from the longitudinal axis 300 of the push screw 206, and the guide blade 262 also rotates with the slip yoke 240 about the push screw 206 along the circumferential direction when the motor 214 is activated. The guide blade 262 may also be pivotal within the slip yoke 204, e.g., within the recess 264 thereof, such as the guide blade 262 may pivot generally about the radial direction. Thus, the guide blade 262 may contact and engage with the helical thread, such as at least the crest 268 thereof, of the push screw 206 while the slip yoke 240 rotates around the push screw 206, and the guide blade 262 may, as a result of such engagement, urge the push screw 206 to reciprocate, e.g., forward and backwards, along the transverse direction T. Further, the rate of travel of the push screw 206 may be proportional to the pitch 304 of the thread. For example, the push screw 206 may travel faster when the guide blade 262 traverses the steeper pitched middle portion of the helical thread and slower when the guide blade travels through one of the shallower pitched end portions of the helical thread. Thus, the door opener 200 may thereby have a brief dwell time at one or both of the zero position and the fully extended position. For example, dwelling in the fully extended position may provide a user an opportunity to grasp the door 124 and pull the door 124 the rest of the way open, e.g., from a partially open position to a fully open position. Such dwell time or times at one or both extremes of the transverse range of movement of the push screw 206 may also or instead be provided by altering, e.g., slowing to a non-zero value and/or stopping, the speed of the motor 214.

Figure 12:
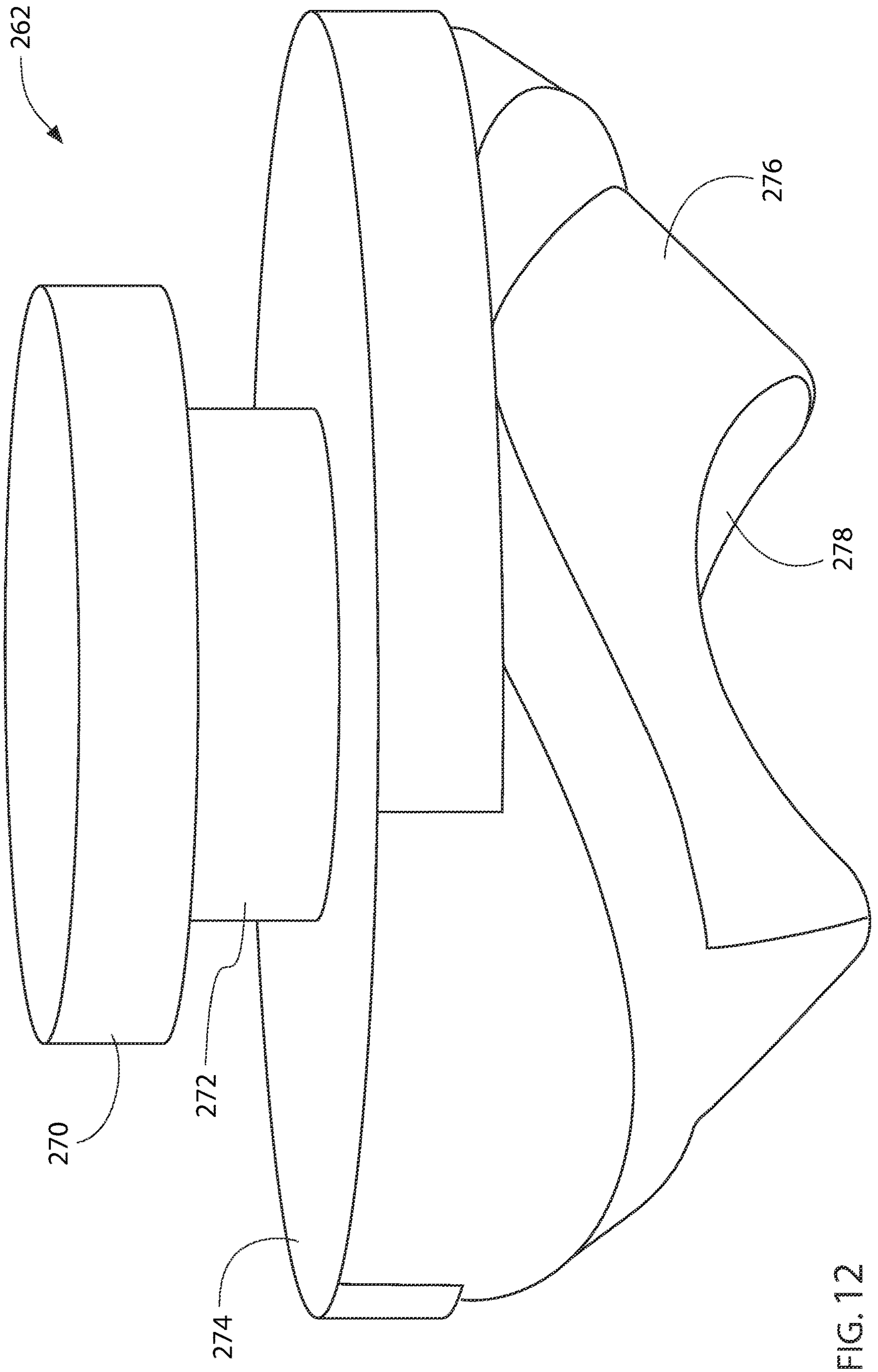
FIG. 12 provides a perspective view of a guide blade of the exemplary door opener of FIG. 4.

An exemplary guide blade 262 is illustrated in a perspective view in FIG. 12. As may be seen in FIG. 12, the guide blade 262 may include an outer flange 270, where "outer" refers to farther away from the push screw 206, such as from the longitudinal axis 300 thereof along the radial direction. The outer flange 270 may be captured within a larger portion of the recess 264 in the slip yoke 240 (see, e.g., FIG. 8) and may be directly adjoined by a neck 272 of the guide blade 262, where the neck 272 is narrower, e.g., defines a lesser outer diameter, than the flange 270. The neck 272 may be captured in a narrower portion of the recess 264 in the slip yoke 240 than the flange 270 is, and thus the flange 270 may help to constrain the guide blade 262 against linear movement along the radial direction, e.g., towards or away from the push screw 206. As may be seen in FIG. 12, the flange 270 and neck 272 may be rounded, e.g., circular, in their cross-sectional shape, such as in a cross-section generally perpendicular to the radial direction. Additionally, the guide blade 262 may also include a base 274 which directly adjoins the neck 272 at an opposite end of the neck 272 from the end at which the neck 272 adjoins the flange 270, and the base 274 may also define a rounded, e.g., circular, cross-sectional shape. Further, the corresponding portions of the recess 264 in the slip yoke 240 may each define complementary rounded shapes to permit the guide blade 262 to pivot within the recess 264, e.g., generally about the radial direction, as described above, such as to promote consistent engagement and contact of the guide blade 262, and in particular a tapered blade portion 276 thereof, with the helical thread of the push screw 206, especially in embodiments where the helical thread defines a variable pitch. The tapered blade portion 276 (which is partially obstructed from view in FIG. 8 by the thread, as noted in the above discussion of FIG. 8) of the guide blade 262 may extend from the base 274 of the guide blade 262, such as towards the push screw 206, e.g., towards the longitudinal axis 300 thereof, when the guide blade 262 is assembled within the slip yoke 240 and the push screw 206 extends through the lumen 242 of the slip yoke 240, as described above. The tapered blade portion 276 may terminate at a concave curved surface 278. The concave curved surface 278 may be generally complimentary to the roots 266 of the thread of the push screw 206. When the door opener 200 is fully assembled, the concave curved surface 278 may be generally parallel to and spaced apart from the roots 266 of the thread of the push screw 206, e.g., as may be seen in FIG. 7.

The guide blade 262 may be constructed of any suitable low-friction material. For example, the guide blade 262 may comprise a low-friction polymeric (e.g., plastic) material, such as acetal plastic or nylon material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance defining a vertical direction, a lateral direction, and a transverse direction, the vertical, lateral, and transverse directions being mutually perpendicular, the refrigerator appliance comprising:

a cabinet defining a food storage chamber, the food storage chamber extending between a front portion and a back portion along the transverse direction, the front portion of the food storage chamber defining an opening for receipt of food items;

a door positioned at the front portion of the food storage chamber and movable between a closed position and an open position to selectively sealingly enclose the food storage chamber in the closed position and provide access to the food storage chamber in the open position; and a door opener attached to the cabinet, the door opener comprising a casing, a push screw extending through the casing towards the door, and a motor in operative communication with the push screw, the motor configured to move the push screw when the motor is activated, wherein the motor rotates a drive gear when the motor is activated and the push screw reciprocates generally along the transverse direction when the motor is activated, wherein the motor rotates the drive gear in a single direction while the push screw reciprocates generally along the transverse direction.

2. The refrigerator appliance of claim 1, wherein the motor rotates the drive gear continuously while the push screw reciprocates generally along the transverse direction.

3. The refrigerator appliance of claim 1, wherein push screw comprises a front portion extending through the casing and a threaded portion, wherein the threaded portion of the push screw comprises a helical thread.

4. The refrigerator appliance of claim 3, wherein the helical thread of the push screw defines a variable pitch.

5. The refrigerator appliance of claim 4, wherein the variable pitch of the helical thread of the push screw is greatest at a center of the helical thread and is less at each end of the helical thread.

6. The refrigerator appliance of claim 1, wherein the door opener further comprises a slip yoke coupled between the motor and the push screw, wherein the push screw extends through the slip yoke.

7. The refrigerator appliance of claim 6, wherein the door opener further comprises a guide blade coupled inside the slip yoke, the guide blade in contact with the push screw.

8. The refrigerator appliance of claim 7, wherein the push screw comprises a front portion extending through the casing and a threaded portion, the guide blade engaged with the threaded portion whereby the guide blade rotates around the push screw along the threaded portion when the motor is activated.

9. The refrigerator appliance of claim 8, wherein the threaded portion of the push screw comprises a variable pitch helical thread, wherein the guide blade is pivotally coupled to the slip yoke, whereby the guide blade travels within the variable pitch helical thread when the motor is activated.

10. The refrigerator appliance of claim 1, wherein push screw comprises a threaded portion, wherein the threaded portion of the push screw comprises a double-helical thread which defines a first helical path and a second helical path continuously joined end-to-end with the first helical path.

11. A refrigerator appliance defining a vertical direction, a lateral direction, and a transverse direction, the vertical, lateral, and transverse directions being mutually perpendicular, the refrigerator appliance comprising:

a cabinet defining a food storage chamber, the food storage chamber extending between a front portion and a back portion along the transverse direction, the front portion of the food storage chamber defining an opening for receipt of food items;

a door positioned at the front portion of the food storage chamber and movable between a closed position and an open position to selectively sealingly enclose the food storage chamber in the closed position and provide access to the food storage chamber in the open position; and a door opener attached to the cabinet, the door opener comprising a casing, a push screw extending through the casing towards the door and a motor in operative communication with the push screw, the motor configured to move the push screw when the motor is activated, wherein the motor rotates a drive gear when the motor is activated and the push screw reciprocates generally along the transverse direction when the motor is activated, wherein the motor rotates the drive gear continuously while the push screw reciprocates generally along the transverse direction.

12. The refrigerator appliance of claim 11, wherein the motor rotates the drive gear in a single direction while the push screw reciprocates generally along the transverse direction.

13. The refrigerator appliance of claim 11, wherein push screw comprises a front portion extending through the casing and a threaded portion, wherein the threaded portion of the push screw comprises a helical thread.

14. The refrigerator appliance of claim 13, wherein the helical thread of the push screw defines a variable pitch.

15. The refrigerator appliance of claim 14, wherein the variable pitch of the helical thread of the push screw is greatest at a center of the helical thread and is less at each end of the helical thread.

16. The refrigerator appliance of claim 11, wherein the door opener further comprises a slip yoke coupled between the motor and the push screw, wherein the push screw extends through the slip yoke.

17. The refrigerator appliance of claim 16, wherein the door opener further comprises a guide blade coupled inside the slip yoke, the guide blade in contact with the push screw.

18. The refrigerator appliance of claim 17, wherein the push screw comprises a front portion extending through the casing and a threaded portion, the guide blade engaged with the threaded portion whereby the guide blade rotates around the push screw along the threaded portion when the motor is activated.

19. The refrigerator appliance of claim 18, wherein the threaded portion of the push screw comprises a variable pitch helical thread, wherein the guide blade is pivotally coupled to the slip yoke, whereby the guide blade travels within the variable pitch helical thread when the motor is activated.

20. The refrigerator appliance of claim 11, wherein push screw comprises a threaded portion, wherein the threaded portion of the push screw comprises a double-helical thread which defines a first helical path and a second helical path continuously joined end-to-end with the first helical path.

* * * * *